United States Patent [19]

Irving

[11] Patent Number: 4,463,169

[45] Date of Patent: Jul. 31, 1984

[54] THREE COMPONENT, CARBOXYL-CONTAINING COMPOSITIONS COMPRISING DIMERCAPTAN

[75] Inventor: Edward Irving, Burwell, England

[73] Assignee: Ciba-Geigy Corporation, Ardsley, N.Y.

[21] Appl. No.: 417,235

[22] Filed: Sep. 13, 1982

[30] Foreign Application Priority Data

Sep. 19, 1981 [GB] United Kingdom ............... 8128383
Jun. 4, 1982 [GB] United Kingdom ............... 8216346

[51] Int. Cl.$^3$ ............................................. C08G 83/00
[52] U.S. Cl. ............................. 528/376; 204/159.22; 204/159.23; 526/258; 526/261; 526/282; 526/286; 526/289; 528/128; 528/192; 528/205; 528/206; 528/226; 528/364
[58] Field of Search ............... 528/376, 226, 128, 192, 528/205, 206, 364; 526/286, 289, 282, 258, 261

[56] References Cited

U.S. PATENT DOCUMENTS

| | | | |
|---|---|---|---|
| 3,615,450 | 10/1971 | Werber et al. | 204/159.23 |
| 3,658,529 | 4/1972 | Yeshin | 560/52 |
| 3,662,022 | 5/1972 | Lard | 560/52 |
| 4,079,183 | 3/1978 | Green | 560/52 |
| 4,179,577 | 12/1979 | Green | 560/52 |
| 4,181,807 | 1/1980 | Green | 560/52 |
| 4,220,513 | 9/1980 | Green et al. | 204/159.23 |

FOREIGN PATENT DOCUMENTS

| | | |
|---|---|---|
| 31305 | 7/1981 | European Pat. Off. . |
| 2944092 | 5/1981 | Fed. Rep. of Germany . |
| 1474715 | 5/1977 | United Kingdom . |

OTHER PUBLICATIONS

H. Warson, "The Applications of Synthetic Resin Emulsions", Ernst Benn Ltd., London, 1972, p. 38.

*Primary Examiner*—Harold D. Anderson
*Attorney, Agent, or Firm*—Luther A. R. Hall

[57] ABSTRACT

Polymerizable compositions comprise
(a) a compound containing
  (i) at least one acryloyloxy or methacryloyloxy group,
  (ii) at least one allyl, methallyl, or 1-propenyl group attached, either directly, or through an oxygen atom or an oxycarbonyl group, to a carbon atom which forms part of an aromatic or cycloaliphatic nucleus,
(b) a compound containing in the molecule both
  (iii) at least one acryloyloxy or methacryloyloxy group and
  (iv) at least one —COOH group, and
(c) a compound containing at least two mercaptan groups directly attached to aliphatic carbon atoms.

Examples of (a) are 2,2-bis(3-allyl-4-(3-(methacryloyloxy)-2-(2-carboxyethylcarbonyloxy)propoxy)-phenyl)propane, 1-(allyloxycarbonyl)-2,4-bis(3-(methacryloyloxy)-2-(2-carboxyethylcarbonyloxy)propoxycarbonyl)benzene, and diallyl bis(3-methacryloyloxy)-2-(2-carboxyethylcarbonyloxy)propyl) esters of benzophenone-3,4,3',4'-tetracarboxylic acid. Examples of (b) are acrylic acid and 2-(methacryloyloxy)ethyl 5-carboxycyclohex-1-ene-4-carboxylate. Examples of (c) are pentaerythritol tetrathioglycollate, trimethylolpropane trithioglycollate, and 3,6-dioxa-1,8-dimercapto-octane.

The compositions may be polymerized by means of actinic irradiation in the presence of an added or "built-in" photosensitizer or by the action of a free-radical catalyst. They are especially useful in the production of printed circuits.

10 Claims, No Drawings

THREE COMPONENT, CARBOXYL-CONTAINING COMPOSITIONS COMPRISING DIMERCAPTAN

BACKGROUND OF THE INVENTION

This invention relates to compositions comprising a polymercaptan which has at least two mercaptan (—SH) groups, a compound which has at least two, and preferably at least three, ethylenically-unsaturated double bonds, and another ethylenically unsaturated compound which contains at least one free carboxyl group. It also relates to the polymerisation of such compositions by means of actinic radiation and/or heat-activated free-radical catalysts, and to the use of the polymerised products as surface coatings, as adhesives, and in reinforced composites, but particularly in printed circuits.

In European Patent Application No. 0031305 we have described polymerisable compositions comprising (1) a compound containing in the molecule both
  (i) at least one group selected from acryloyloxy and methacryloyloxy groups,
  (ii) at least one group selected from allyl, methallyl, and 1-propenyl groups each of which is attached to a carbon atom which forms part of an aromatic nucleus, either directly or through an oxygen atom or an oxycarbonyl group (—OOC—) which is in turn directly attached to such a carbon atom,
(2) a compound containing, per molecule, at least two mercaptan groups directly attached to aliphatic carbon atoms, in a proportion as to supply at least 0.8 such mercaptan group per group selected from allyl, methallyl and 1-propenyl groups in (1) but less than 1.0 such mercaptan group per group selected from acryloyl, methacryloyl, allyl, methallyl, and 1-propenyl groups in (1).

The compositions are polymerised by exposing them to actinic radiation or to the effect of a free-radical catalyst.

In the so-called negative resist method for the production of printed circuits by means of photopolymerisation it is conventional to coat a substrate with a photopolymerisable composition and to expose the coated substrate to actinic radiation through a negative with substantially transparent and substantially opaque areas so that polymerisation takes place in the areas of the coating which have been struck by radiation. Alternatively, such exposure can be carried out using computer-controlled laser beams instead of such a negative. Then the image is developed by dissolving away with a suitable solvent the areas where polymerisation had not occurred, i.e., those areas which had not been struck by actinic radiation. Subsequently, the substrate, usually of copper, may be exposed to etching liquids so that areas not protected by the layer of photopolymerised composition are etched. In further processing, such as in the manufacture of multilayer boards, the layer of photopolymerised composition may have to be removed, generally by mechanical means.

Disadvantages of processes presently employed are that organic solvents are often used for development, with associated risks due to toxicity and flammability, and that mechanical processes for removing the photopolymerised composition may cause damage to the printed circuit.

In the process of this invention there is used a polymerisable composition which also contains carboxylic acid groups; if exposure to actinic radiation is effected as through a negative with substantially opaque areas, it is possible to remove the composition from unexposed zones by treatment with an aqueous alkaline solution, due to salt formation on the carboxylic acid groups. Use of an organic solvent for this purpose, with its attendant disadvantages, is therefore avoided. A further advantage is that the polymerised composition can be subsequently removed if desired by use of more strongly aqueous alkaline solutions.

SUMMARY OF THE INVENTION

One aspect of this invention accordingly provides polymerisable compositions comprising
(a) a compound containing in the molecule
  (i) at least one group selected from acryloyloxy and methacryloyloxy groups,
  (ii) at least one group selected from allyl, methallyl, and 1-propenyl groups, each of which is attached, either directly or through an oxygen atom or an oxycarbonyl group (—OCO—), to a carbon atom which forms part of an aromatic nucleus,
the total of the said groups (i) and (ii) being preferably at least three,
(b) a compound containing in the molecule
  (iii) at least one group selected from acryloyloxy and methacryloyloxy groups and
  (iv) at least one free carboxyl group, and
(c) a compound containing, per molecule, at least two mercaptan groups directly attached to an aliphatic carbon atom or atoms, in a proportion as to supply at least 0.8 such mercaptan group per group selected from allyl, methallyl, and 1-propenyl group in (a) but less than 1.0 such mercaptan group per group selected from acryloyl, methacryloyl, allyl, methallyl, and 1-propenyl groups in (a) with (b).

Other aspects of this invention include a process for the polymerisation of such compositions, comprising exposing them to actinic radiation or to the effect of a heat-activated free-radical catalyst, and the polymerised products obtained by such a process.

DETAILED DISCLOSURE

Preferably (b) is present in an amount sufficient to provide 0.75 to 1.25 groups selected from acryloyloxy and methacryloyloxy groups per group selected from acryloyloxy and methacryloyloxy groups present in (a).

In British Pat. No. 1,474,715 there are described photopolymerisable acrylic esters containing free carboxylic acid groups which are prepared by the reaction of an at least dianhydride of a polycarboxylic acid with an alcohol containing at least two acrylic ester groups. In U.S. Pat. Nos. 4,079,183, 4,181,807, and 4,179,577 there are described photopolymerisable compounds containing free carboxylic acid groups and some specific unsaturated groups linking two aromatic rings, obtained by reaction of an at least dianhydride of a polycarboxylic acid with alcholic hydroxyl groups of an alcohol containing at least one of the specified unsaturated groups. In all of these publications removal of the unphotopolymerised material by contact with an aqueous alkaline solution is described, but the photopolymerisation of such materials in the presence of a polymercaptan is not mentioned.

In the compositions of this invention component (a) preferably contains no ethylenic unsaturation other than in acryloyloxy, methacryloyloxy, allyl, methallyl, and 1-propenyl groups. It preferably has a molecular weight of at most 5000. Preferably the, or each, acryloyloxy or methacryloyloxy group is attached to a carbon atom of an aromatic nucleus, directly or through a group of formula

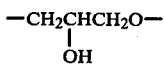   I or

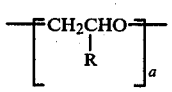   II where
R denotes a hydrogen atom or a methyl group and a is an integer of from 1 to 6.

Preferably component (a) contains at least two and at most six groups chosen from acryloyloxy and methacryloyloxy groups per molecule, and preferably it contains at least two and at most fifteen groups chosen from allyl, methallyl, and 1-propenyl groups per molecule.

Yet further preferred as component (a) are compounds in which the total number of groups chosen from acryloyloxy and methacryloyloxy groups per molecule is the same as the total number in that molecule of groups chosen from allyl, methallyl, and 1-propenyl groups.

The, or each, aromatic nucleus in component (a) is preferably a benzene nucleus or a naphthalene nucleus.

Further preferred as component (a) are polyhydric phenols, at least two phenolic hydroxyl groups of which are esterified with acryloyl or methacryloyl groups, either directly or through the (terminal) ether oxygen atom of a group of formula I or II, and at least two phenolic hydroxyl groups of which are directly etherified with groups chosen from allyl, methally, and 1-propenyl groups.

Also preferred as component (a) are polycarboxylic acids, at least one carboxylic acid group of which is linked to an acryloyl or methacryloyl group through the (terminal) carbon atom of a group of formula I or II and at least one carboxylic acid group of which is esterified directly with a group chosen from allyl, methallyl, and 1-propenyl groups.

Particularly preferred as component (a) are polyhydric phenols, at least two phenolic hydroxyl groups of which are esterified with groups chosen from acryloyl and methacryloyl groups, either directly or through the (terminal) ether oxygen atom of a group of formula I or II aforesaid, the polyhydric phenol being substituted directly on carbon atoms in the benzene or naphthalene nucleus or nuclei by at least two groups chosen from allyl, methallyl, and 1-propenyl groups, especially such compounds where these groups are ortho to the said acryloyl or methacryloyl groups.

Examples of compounds suitable as component (a) are those of the following formulae:

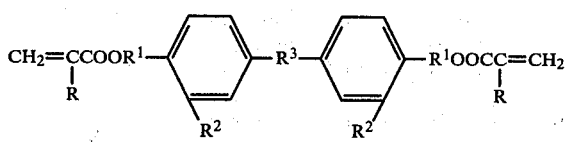   III

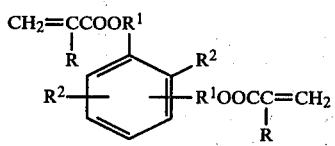   IV

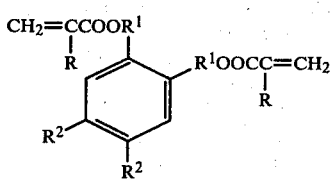   V

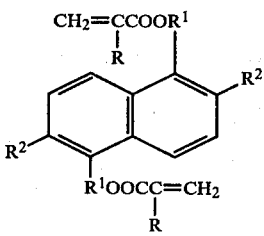   VI

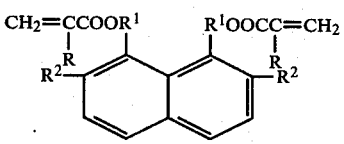   VII

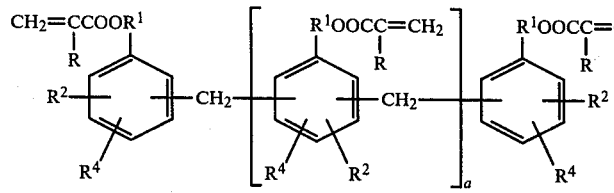
VIII

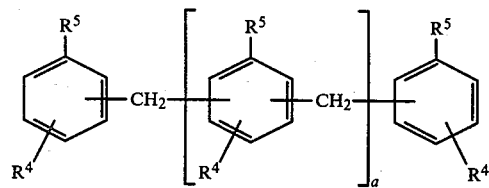
IX

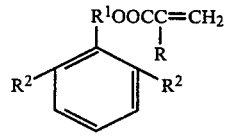
X

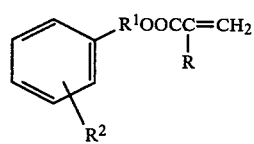
XI and

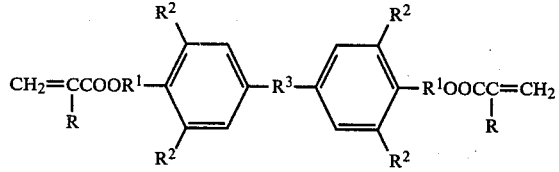
XII where
R and a have the meanings assigned in formula II,
each $R^1$ denotes an oxygen-carbon bond or a group of formula I or II as defined above,
each $R^2$ denotes an allyl, methallyl, or 1-propenyl group,
$R^3$ denotes a carbon-carbon bond, an alkylene or alkylidene group of up to 5 carbon atoms, an ether oxygen atom, a sulphur atom, or a group of formula —CO—, —SS—, —SO—, or —SO$_2$—,
each $R^4$ denotes a hydrogen, chlorine, or bromine atom, or an alkyl group of 1 to 4 carbon atoms, and
each $R^5$ denotes a group of formula $CH_2$=C(R)COOR$^1$— or an allyloxy, methallyloxy, or 1-propenyloxy group such that at least one denotes a said group of formula $CH_2$=C(R)COOR$^1$— and at least two each denote an allyloxy, methallyloxy, or 1-propenyloxy group,
with the proviso that, in formulae VIII and IX, each —CH$_2$— and $R^2$— group shown in ortho or para to an indicated group $CH_2$=C(R)COOR$^1$— and $R^5$—.

Specific examples of compounds suitable as component (a) are:

2,2-bis(3-allyl-4-(methacryloyloxy)phenyl)propane, bis(3-allyl-4-(methacryloyloxy)phenyl)methane, 2,2-bis(3-methallyl-4-(methacryloyloxy)phenyl)propane, bis(3-methallyl-4-(methacryloyloxy)phenyl)methane, 2,2-bis(3-(1-propenyl)-4-(methacryloyloxy)phenyl)propane, bis(3-(1-propenyl)-4-(methacryloyloxy)phenyl)methane, and their acryloyl analogues:

2,2-bis(3-allyl-4-(3-(methacryloyloxy)-2-hydroxypropoxy)phenyl)propane, bis(3-allyl-4-(3-(methacryloyloxy)-2-hydroxypropoxy)phenyl)methane, the corresponding bis(3-methally) and bis(3-(1-propenyl)) compounds, and the acryloyl analogues:

2,2-bis(3-allyl-4-(2-(methacryloyloxy)ethoxy)phenyl)propane, bis(3-allyl-4-(2-methacryloyloxy)ethoxy)phenyl)methane, 2,2-bis(3-methally-4-(2-(methacryloyloxy)ethoxy)phenyl)propane, the corresponding bis(3-methallyl) and bis(3-(1-propenyl)) compounds, and the acryloyl analogues:

2,2-bis(3-allyl-4-(2-(methacryloyloxy)-2-methylethoxy)phenyl)propane, bis(3-allyl-4-(2-(methacryloyloxy)-2-methylethoxy)phenyl)methane, the corresponding bis(3-methallyl) and bis(3-(1-propenyl)) compounds, and the acryloyl analogues;

2,6-diallylphenyl acrylate, 2,6-dimethallylphenyl acrylate, 2,6-di(1-propenyl)phenyl acrylate, and the methacrylates;

1,3-diallyl-2-(2-hydroxy-3-(methacryloyloxy)propoxy)-benzene and the corresponding 1,3-dimethallyl and 1,3-di(1-propenyl) compounds;

1-allyl-2-(2-methacryloyloxy)ethoxy)benzene, 1-allyl-2-hydroxy-2-(methacryloyloxy)propoxy)benzene, 1-allyl-2-(2-(methacryloyloxy)-2-methylethoxy)benzene, and the corresponding 1-methallyl compounds, and the acryloyl analogues;

1,3-diallyl-2-(2-methacryloyloxy)ethoxy)benzene, 1,3-dimethallyl-2-(2-methacryloyloxy)ethoxy)benzene, 1,3-di(1-propenyl)-2-(2-(methacryloyloxy)ethoxy)benzene, and the acryloyl analogues;

1,3-diallyl-2-(2-(methacryloyloxy)-2-methylethoxy)benzene, 1,3-dimethallyl-2-(2-(methacryloyloxy)-2-methylethoxy)benzene, 1,3-di(1-propenyl)-2-(2-(methacryloyloxy)-2-methylethoxy)benzene, and the acryloyl analogues;

2,2-bis(3,5-diallyl-4-(methacryloyloxy)phenyl)propane, bis(3,5-diallyl-4-(methacryloyloxy)phenyl)methane, the corresponding bis(3,5-dimethallyl) and bis(3,5-di(1-propenyl)) compounds, and the acryloyl analogues;

2,2-bis(3,5-diallyl-4-(3-(methacryloyloxy)-2-hydroxypropoxy)phenyl)propane, bis(3,5-diallyl-4-(3-(methacryloyloxy)-2-hydroxypropoxy)phenyl)methane, the corresponding bis(3,5-dimethallyl) and bis(3,5-di(1-propenyl)) compounds and the acryloyl analogues.

Other compounds which may be used as component (a) contain one or two acryloyloxy or methacryloyloxy groups and only one allyl, methallyl, or 1-propenyl group per molecule. The latter group may be attached to an oxycarbonyl group which is in turn directly attached to a carbon atom which forms part of an aromatic nucleus, as in those of formula

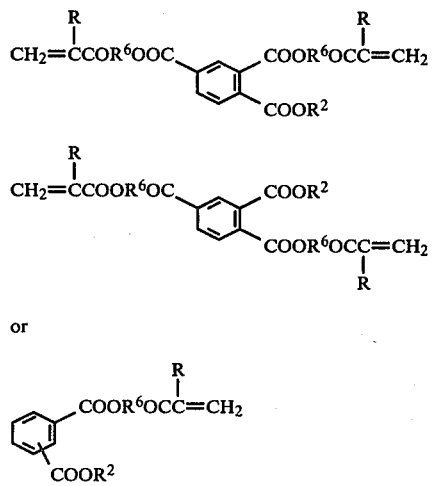

where
R has the meaning assigned in formula II,
$R^1$ and $R^2$ have the meanings assigned in formulae III to XII, and
each $R^6$ denotes a group of formula I or II.

Specific examples of compounds of formula XIII to XV are:

1-(allyloxycarbonyl)-2,4-bis(3-(methacryloyloxy)-2-hydroxypropoxycarbonyl)benzene, 1-(allyloxycarbonyl)-2,5-bis(3-(methacryloyloxy)-2-hydroxypropoxycarbonyl)benzene, 1-(allyloxycarbonyl)-2,4-bis(methacryloyloxycarbonyl)benzene, 1-(allyloxycarbonyl)-2,5-bis(methacryloyloxycarbonyl)benzene, the corresponding 1-(methallyloxycarbonyl) compounds, the corresponding 1-(1-propenyloxycarbonyl) compounds, 1-allyloxycarbonyl-2-(3-methacryloyloxy-2-hydroxypropoxycarbonyl)benzene, 1-(methallyloxycarbonyl)-2-(3-methacryloyloxy-2-hydroxypropoxycarbonyl)benzene, and the corresponding acryloyloxy compounds.

Other compounds, which contain two or more acryloyloxy or methacryloyloxy groups and one or more allyl, methallyl, or 1-propenyl groups per molecule, are those of formula

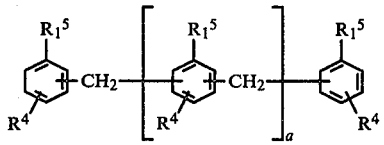

where
each $R_1^5$ denotes $CH_2=C(R)COOR^1-$ or allyloxy, methallyloxy, or 1-propenyloxy, at least two denoting a said group of formula $CH_2=C(R)COOR^1-$ and at least one denoting an allyloxy, methallyloxy, or 1-propenyloxy group, the $-CH_2-$ groups being ortho or para to a group $-R_1^5$,
R and a have the meanings assigned in formula I,
$R^1$ has the meaning assigned in formulae III to VIII and X to XII,
and $R^4$ has the meaning assigned in formulae VIII and IX.

There may also be used as component (a) products which contain six or more, e.g., twelve, allyl, methallyl, or 1-propenyl groups per molecule and which may be obtained by processes involving advancement. For example, a diglycidyl ether of a dihydric phenol which is substituted in the aromatic nucleus or nuclei by one or more allyl, methallyl, or 1-propenyl groups may be advanced with a dihydric phenol, a dihydric alcohol, a dicarboxylic acid, or a hydantoin having two free $-NH-$ groups in the hydantoin ring or rings. The advanced product is then caused to react, at the secondary hydroxyl groups so formed, with glycidyl (meth)acrylate or (meth)acryloyl chloride.

Other advanced products containing six or more allyl, methallyl, or 1-propenyl groups may be obtained by advancement of diglycidyl ethers of dihydric phenols, diglycidyl ethers of dihydric alcohols, or di(N-glycidyl)hydantoins such as 1,3-diglycidylhydantoin and 3,3'-diglycidyl-1,1'-methylenebis(hydantoin) with a dihydric phenol substituted in the aromatic nucleus or nuclei by one or more allyl, methallyl, or 1-propenyl groups, followed by reaction at the secondary hydroxyl groups so generated with glycidyl (meth)acrylate or (meth)acryloyl chloride.

There may also be used as component (a) benzophenone derivatives of the formula

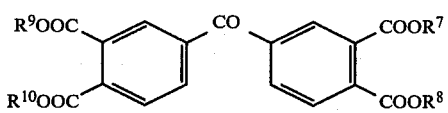

where
one of $R^7$ and $R^8$, and one of $R^9$ and $R^{10}$, have the same meaning and each denotes an allyl or methallyl group, and
each of the remaining symbols of $R^7$ and $R^8$, and of $R^9$ and $R^{10}$, denotes the residue of an alcohol after removal of an alcoholic hydroxyl group, said residue containing a (meth)acrylloxy group, especially as a (meth)acryloyloxyalkyleneoxy or (meth)acryloyloxyhydroxyalkyleneoxy group.

Preferably each of the remaining symbols of $R^7$ and $R^8$, and $R^9$ and $R^{10}$, represents a group of formula

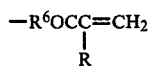   XVIII where
R has the meaning assigned in formula II and
$R^6$ has the meaning assigned in formula XIII and XIV.

Most previously known substances which polymerise on exposure to actinic radiation are used with a photoinitiator such as benzoin and its alkyl ethers to shorten the exposure time required for polymerisation. However, sometimes the use of an initiator is inconvenient. Thus, it may alter the electrical properties of the polymer. It may volatilise on being heated, so making it unsuitable for use in multilayer printed circuits; hence, in their preparation, the polymer must be removed after a metal etching process has taken place, which removal adds to the cost of the laminates and may cause damage to the surface of the metal.

We have found that the use of an additional photoinitiator can be avoided by employment, as component (a), of compounds of formula XVII.

Specific examples of compounds of formula XVII are the diallyl bis(3-(methacryloyloxy)-2-hydroxypropyl) tetraesters of benzophenone-3,4,3′,4′-tetracarboxylic acid.

Methods for the preparation of compounds suitable for use as component (a) are the same as the methods described in the European Patent Application mentioned above.

Component (b) preferably has a molecular weight of at most 1000. Preferably the, or each, acryloyloxy or methacryloyloxy group is attached directly to a hydrogen atom or, directly or via a carboxyl-containing group, to a carbon atom of an aliphatic, cycloaliphatic, or aromatic group or to a nitrogen atom forming part of a heterocyclic ring, particularly through such a group of formula

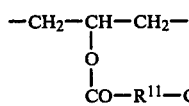   XIX where $R^{11}$ denotes an alkylene, arylene, or aralkylene group, which may be substituted by one or more further carboxylic acid groups, the said alkylene groups, and the alkylene portion of aralkylene groups, having from 2 to 10 carbon atoms, and the said arylene groups, and the arylene portion of aralkylene groups, having from 6 to 10 carbon atoms.

Preferably component (b) contains at most six groups chosen from acryloyloxy and methacryloyloxy groups per molecule and at most two carboxyl groups per molecule.

The or each aromatic group in component (b) is preferably a benzene nucleus or a naphthalene nucleus.

Further preferred as component (b) are polyhydric phenols, at least two phenolic hydroxyl groups of which are esterified by acryloyl or methacryloyl groups through a carboxyl-containing group of formula XIX.

Examples of such compounds suitable as component (b) are those of the following formulae

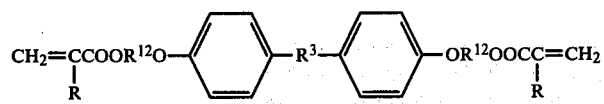   XX

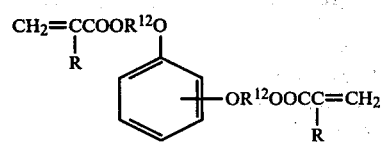   XXI

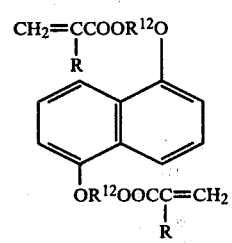   XXII

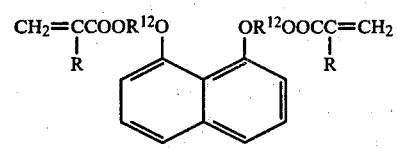   XXIII

-continued

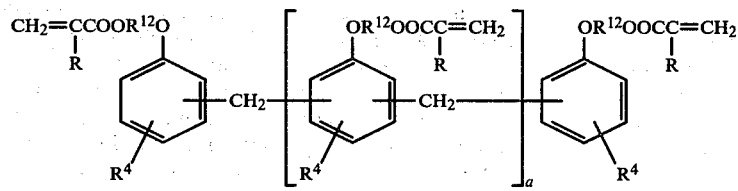
XXIV

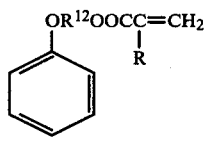
XXV

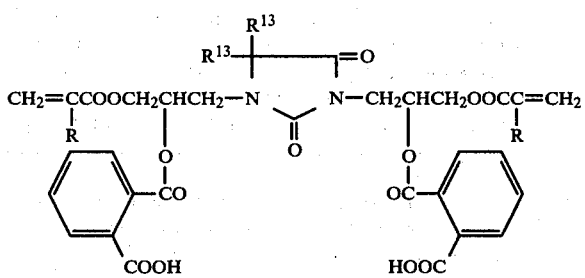
XXVI and

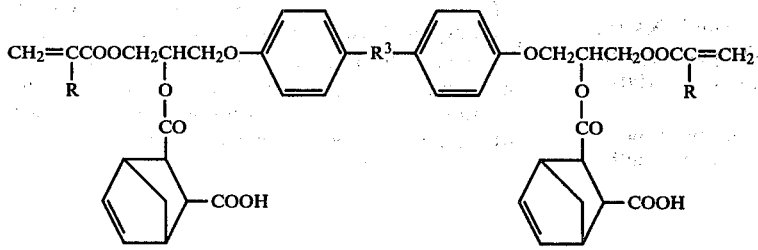
XXVII where
a and R have the meaning assigned in formula II,
$R^3$ has the meaning assigned in formulae III and XII,
$R^4$ has the meaning assigned in formula VIII and IX,
each $R^{12}$ denotes a carboxyl-containing group of formula XIX as defined above, and
each $R^{13}$ denotes an alkyl group of 1 to 8 carbon atoms, particularly a methyl or ethyl group, an aralkyl group of 7 to 9 carbon atoms, or an aryl group of 6 to 8 carbon atoms, or the two $R^{13}$ together with the attached carbon atom denote a cyclopentane or cyclohexane ring,
with the proviso that, in formula XXIV, each —CH$_2$— group shown is ortho or para to an indicated group $CH_2=C(R)COOR^{12}O$—.

Specific examples of compounds suitable as component (b) are the partial esters with succinic, maleic, glutaric, adipic, phthalic, tetrahydrophthalic, hexahydrophthalic, endomethylenetetrahydrophthalic, pyromellitic, or trimellitic acids of the following alcohols: 2,2-bis(4-(3-(methacryloyloxy)-2-hydroxypropoxy)-phenyl)propane, bis(4-(3-(methacryloyloxy)-2-hydroxypropoxy)phenyl)methane, and their acryloyl analogues.

Other compounds which may be used as component (b) contain one to four carboxylic acid groups and two acryloyloxy or methacryloyloxy groups, as in those of formula

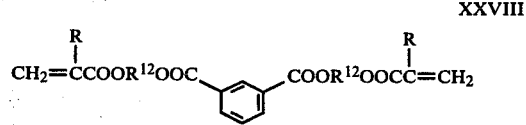
XXVIII or

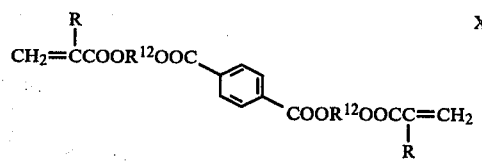
XXIX where
each $R^{12}$ has the meaning assigned in formulae XX-XXVII and
R is as defined in formula II.

Specific examples of compounds of formula XXVIII or XXIX are the partial esters with succinic, maleic, glutaric, adipic, phthalic, tetrahydrophthalic, hexahydrophthalic, endomethylenetetrahydrophthalic, pyromellitic acid, or trimellitic acid with the following alcohols:
1,3-bis(3-(methacryloyloxy)-2-hydroxypropoxycarbonyl)benzene, 1,4-bis(3-(methacryloyloxy)-2- hydroxypropoxycarbonyl)benzene, and the corresponding acryloyloxy compounds.

Other compounds suitable for use as component (b) are of the formula

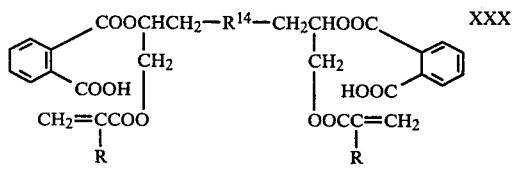    XXX where
R is as defined in formula II and
$R^{14}$ represents a group of formula

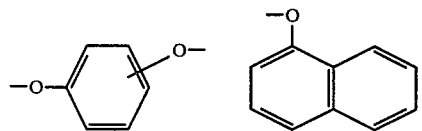

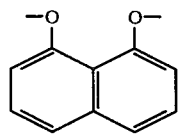  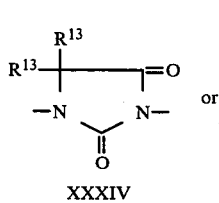 or

XXXIII       XXXIV

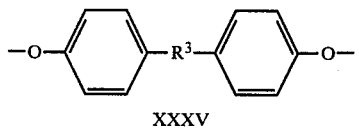

XXXV (wherein $R^3$ is as defined in formulae III and XII and $R^{13}$ is as defined in formula XXVI).

Other compounds suitable for use as (b) are acrylic acid, methacrylic acid, and compounds in which the or each acryloyloxy or methacryloyloxy group is directly attached to a carbon atom of an aliphatic radical, particularly compounds of formula

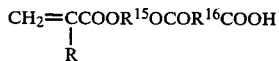    XXXVI where
R has the meaning assigned in formula II,
$R^{15}$ denotes —CH$_2$CH$_2$— or

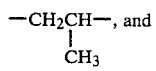, and $R^{16}$ denotes the residue of an at least dicarboxylic acid after removal of both carboxyl groups.

Preferably $R^{16}$ is the residue of maleic, succinic, glutaric, adipic, phthalic, tetrahydrophthalic, hexahydrophthalic, endomethylenetetrahydrophthalic, trimellitic, or pyromellitic acid.

Compounds of formulae XX to XXX are obtainable from suitable glycidyl derivatives by opening the epoxide groups through reaction with (meth)acrylic acid and esterification of the resulting secondary alcoholic hydroxyl groups with an anhydride of a di- or poly-carboxylic acid. Alternatively, they may be obtained by reaction of the corresponding phenols, alcohols, amines, or amide-imides with glycidyl acrylate or glycidyl methacrylate, followed by esterification with an anhydride of a di- or poly-carboxylic acid.

Compounds of formula XXXVI are obtainable by reaction with a dicarboxylic or polycarboxylic acid anhydride with 2-hydroxyethyl (meth)acrylate or 2-hydroxypropyl (meth)acrylate.

A wide range of polymercaptans is suitable for use as component (c) in the compositions of this invention. Preferably the mercaptans are free from any allyl, methallyl, 1-propenyl, acryloyl or methacryloyl group, and preferably they have a molecular weight of not more than 3,000. The polymercaptans employed usually contain not more than six mercaptan groups per molecule directly attached to aliphatic carbon atoms; preferably, however, they contain more than two such groups.

One class comprises esters of monomercaptanalkylenecarboxylic acids with polyhydric alcohols or of aliphatic monomercaptanmonohydric alcohols with polycarboxylic acids.

Further preferred such esters are of the formula

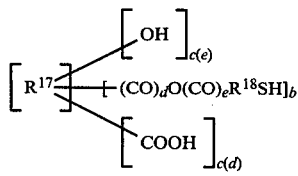    XXXVII where
$R^{17}$ represents an aliphatic or araliphatic hydrocarbon radical of from 2 to 60 carbon atoms, which may be interrupted in the chain by not more than one ether oxygen atom,
$R^{18}$ represents an aliphatic hydrocarbon radical, which may be interrupted in the chain by not more than one carbonyloxy group, and is preferably of from 1 to 4 carbon atoms,
b is an integer of from 2 to 6,
c is zero or a positive integer of at most 3, such that (b+c) is at most 6 (terms such as c(d) being construed algebraically), and
d and e each represent zero or 1, but are not the same.

Yet further preferred esters are polymercaptans of formula XXXVIII which are also of formula

    XXXVIII where
b has the meaning assigned in formula XXXVII,
$R^{19}$ is an aliphatic hydrocarbon radical of from 2 to 10 carbon atoms, and
$R^{20}$ denotes —(CH$_2$)—, —(CH$_2$)$_2$—, or —CH(CH$_3$)—.

A second class comprises mercaptan-containing esters, including esters of monomercaptandicarboxylic acids, of formula

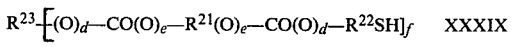    XXXIX where d and e have the meanings assigned in formula XXXVIII, f is an integer of from 1 to 6, $R^{21}$ represents a divalent organic radical, linked through a carbon atom or carbon atoms thereof to the indicated —O— or —CO— units, $R^{22}$ represents a divalent organic radical, linked through a carbon atom or carbon atoms thereof to the indicated —SH group and —O— or —CO— unit, and $R^{23}$ represents an organic radical, which must contain at least one aliphatic —SH group when f is 1, and preferably contains at least one such group when f is 2, linked through a carbon atom or carbon atoms thereof to the indicated adjacent —O— or —CO— unit or units.

When d is zero, $R^{21}$ preferably denotes a saturated aliphatic unbranched hydrocarbon chain of 2 to 20 carbon atoms, which may be substituted by one or more methyl groups and by one or more mercaptan groups and which may be interrupted by one or more ether oxygen atoms and by one or more carbonyloxy groups. When d is 1, $R^{21}$ preferably denotes (i) a saturated aliphatic hydrocarbon group of 2 to 10 carbon atoms, which may bear a mercaptan group, (ii) a cycloaliphatic-aliphatic hydrocarbon group of 5 to 34 carbon atoms, which may contain one or more ethylenically-unsaturated double bonds, or (iii) a mononuclear arylene hydrocarbon group of 6 to 12 carbon atoms.

$R^{22}$ preferably denotes, when d is zero, a saturated aliphatic hydrocarbon group of 1 to 3 carbon atoms, which may bear a carboxyl group, and, when d is 1, it preferably denotes a saturated aliphatic hydrocarbon group of 2 to 4 carbon atoms, which may be substituted by a hydroxyl group or by a chlorine atom.

$R^{23}$ preferably denotes (iv) an aliphatic or cycloaliphatic-aliphatic hydrocarbon group of 2 to 51 carbon atoms, which may bear at least one aliphatic mercaptan group, or (v) a mononuclear or dinulcear arylene hydrocarbon group of 6 to 15 carbon atoms, or (vi) a chain of 4 to 20 carbon atoms, interrupted by at least one ether oxygen atom and optionally substituted by at least one aliphatic mercaptan group, or (vii) a chain of 6 to 50 carbon atoms, interrupted by at least one carbonyloxy group, optionally interrupted by at least one ether oxygen atom, and optionally substituted by at least one aliphatic mercaptan group.

A third class comprises esters and ethers of formula

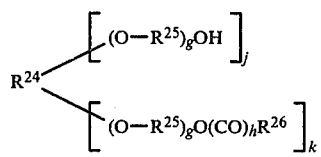

XL where $R^{24}$ represents a radical of a polyhydric alcohol after removal of (j+k) alcoholic hydroxyl groups, especially an aliphatic hydrocarbon radical of from 2 to 10 carbon atoms, each $R^{25}$ denotes an alkylene group containing a chain of at least 2 and at most 6 carbon atoms between the indicated consecutive oxygen atoms, $R^{26}$ represents an aliphatic radical of 1 to 6 carbon atoms containing at least one mercaptan group, g is a positive integer, preferably such that the average molecular weight of the polymercaptan is not more than 2,000, h is zero or 1, j is zero or a positive integer such that (j+k) is at most 6, and k is an integer of from 2 to 6, preferably of from 3 to 6.

The groups $R^{25}$ in individual poly(oxyalkylene) chains may be the same or different and they may be substituted by, e.g., phenyl or chloromethyl groups. Preferably they are —$C_2H_4$— or —$C_3H_6$— groups.

Preferred amongst the compounds of formula XL are the esters of formula

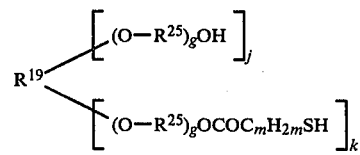

XLI and ethers of formula

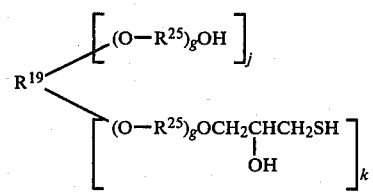

XLII where $R^{19}$ has the meaning assigned in formula XXXVIII, $R^{25}$, g, j, and k have the meanings assigned in formula XL, and m is 1 or 2.

A fourth class of polymercaptans suitable as component (b) are mercaptan-terminated sulphides of formula

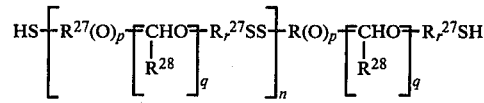

XLIII where each $R^{27}$ denotes an alkylene hydrocarbon group containing from 2 to 4 carbon atoms, $R^{28}$ denotes a hydrogen atom or a methyl or ethyl group, n is an integer which has an average value of at least 1, and is preferably such that the average molecular weight of the sulphide is at most 1000, and either p is zero, in which case q and r are each also zero, or p is 1, in which case q is zero or 1 and r is 1.

The preferred sulphides of formula XLIII are those where $R^{28}$ denotes hydrogen and p and q are each 1, n being such that the molecular weight of the sulphide is from 500 to 800.

A fifth class of polymercaptans suitable as component (b) comprises mercaptan-terminated poly(butadienes) of formula

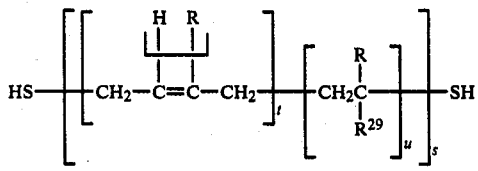   XLIV where
each R has the meaning assigned in formula II,
$R^{29}$ represents —CN, —COOH, —CONH$_2$, —COOR$^{30}$, —C$_6$H$_5$, or —OCOR$^{30}$, where R$^{30}$ is an alkyl group of one to eight carbon atoms,
t is an integer of at least one,
u is zero or a positive integer, and
s is an integer of more than one, preferably such that the average number molecular weight of the polymercaptan is not more than 1000.

A sixth class of polymercaptans for use as component (b) comprises mercaptan-terminated oxyalkylene compounds of formula

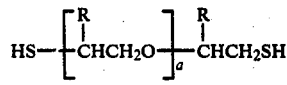   XLV where a and each R have the meanings assigned in formula II.

A seventh class comprises poly(thioglycollates) and poly(mercaptopropionates) of tris(2-hydroxyethyl)isocyanurate, tris(2-hydroxypropyl)isocyanurate, and of N,N'-bis(2-hydroxyethyl)- and N,N'-bis(2-hydroxypropyl)-hydantoins, i.e., compounds of formula

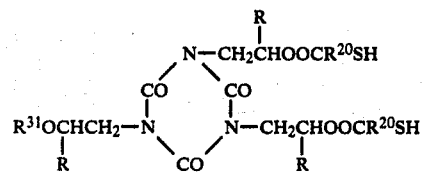   XLVI

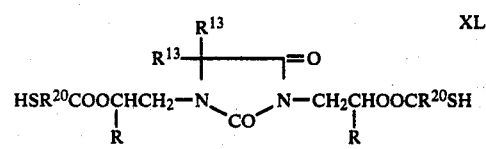   XLVII where
each R has the meaning assigned in formula II,
each $R^{13}$ has the meaning assigned in formula XXVI,
each $R^{20}$ has the meaning assigned in formula XXXVIII, and
$R^{31}$ denotes a group —OCR$^{20}$SH or a hydrogen atom.

Specific examples of suitable polymercaptans (c) are pentaerythritol tetrathioglycollate, dipentaerythritol hexa(3-mercaptopropionate), trimethylolpropane trithioglycollate, ethylene glycol dithioglycollate, a tris(3-mercapto-2-hydroxypropyl ether) of a polyoxypropylene triol of average molecular weight 800, a polysulphide of average formula

HS(C$_2$H$_4$OCH$_2$OC$_2$H$_4$SS)$_6$C$_2$H$_4$OCH$_2$OC$_2$H$_4$SH   XLVIII

N,N',N''-tris(2-(mercaptoacetyloxy)ethyl)-1,3,5-triazine-2,4,6-trione, and 1,3-bis(2-(mercaptoacetyloxy)ethyl)-5,5-dimethylhydantoin.

In photopolymerising the compositions of this invention, actinic radiation of wavelength 200–600 n is preferably used. Suitable sources of actinic radiation include carbon arcs, mercury vapour arcs, fluorescent lamps with phosphors emitting ultraviolet light, argon and xenon glow lamps, tungsten lamps, and photographic flood lamps. Of these, mercury vapour arcs, particularly sun lamps, fluorescent sun lamps, and metal halide lamps are most suitable. The time required for the exposure of the photopolymerisable composition will depend upon a variety of factors which include, for example, the individual compounds used, the type of light source, and its distance from the irradiated composition. Suitable times may be readily determined by those familiar with photopolymerisation techniques.

For photopolymerisation, the compositions should (except those containing a compound of formula XVII) contain an added photoinitiator, i.e., a catalyst which, on irradiation, gives an excited state that leads to formation of free radicals which then initiate polymerisation of the composition. Examples of suitable photoinitiators are given in the European Patent Application mentioned above. Generally, 0.05 to 10%, and preferably 0.5 to 5%, by weight of the photoinitiator is incorporated, based on the combined weights of the components (a), (b), and (c).

Suitable free radical catalysts for the polymerisation of the compositions of this invention are heat-activated, i.e., they exert an appreciably rapid polymerising effect only at temperatures above ambient temperature. Suitable such catalysts are also given in the European Patent Application mentioned above.

The amount of free radical catalyst, together with any accelerator therefor, is usually from 0.05 to 5%, and preferably from 0.1 to 1%, by weight, calculated on the total of the weights of components (a), (b), and (c). Standard methods of free radical catalyst-induced polymerisation can be employed.

The compositions of this invention may be used as surface coatings, for the production of printing plates and printed circuits, as adhesives, for the production of fibre-reinforced composites, for dip-coatings, filament windings, and sheet moulding compositions, using the methods described in the European Patent Application mentioned above.

This invention accordingly provides articles bearing thereon a surface coating comprising a polymerised product produced by a process of this invention, and articles having surfaces bonded together by means of a polymerised product made by a process of this invention.

We have further found that it is possible to cure the compositions of this invention in two stages: such a composition, containing a heat-activated free-radical catalyst and also a photoinitiator if necessary, may be partly polymerised by exposure to an amount of actinic radiation insufficient to cause complete polymerisation, and then it is heated so that the free-radical catalyst is activated and curing is complete.

Other aspects of this invention therefore comprise a composition containing a component (a), a component (b), and a component (c) as aforesaid, a photoinitiator if necessary, and a heat-activated free-radical catalyst, and a process for curing such a composition comprising partially polymerising it by exposing it to actinic radiation and then heating it to activate the heat-activated free-radical catalyst.

Such compositions may be used to form film adhesives, composites, dip-coating, and in making sheet moulding compositions as described in the U.S. Pat. No. 4,220,513.

Compositions of the invention may be marketed in two component packs, one containing components (a) and (c) and the other component (b), or as three component packs. Otherwise, they may be stored for short periods as mixtures, protected from actinic radiation and sources of free radicals.

The following Examples illustrate the invention. Percentages are by weight.

2,2-Bis(3-allyl-4-(3-(methacryloyloxy)-2-hydroxypropoxy)phenyl)propane was prepared as described in the above-mentioned European Patent Application or as follows:

2,2-Bis(3-allyl-4-hydroxyphenyl)propane (308 g) was mixed with 2-methoxyethanol (10 g) and epichlorohydrin (740 g) and heated to 60° C. Sodium hydroxide flake (80 g) was added portionwise over 3 hours, and the mixture was stirred for a further ½ hour, also at 60° C. The mixture was filtered, the residue being washed with toluene, and the filtrate was evaporated to remove the solvents and the excess of epichlorohydrin. The concentrated product was filtered once more to give 334 g of 2,2-bis(3-allyl-4-(glycidyloxy)phenyl)propane, having an epoxide content of 4.03 equiv./kg and 4.5 allyl double bond equiv./kg.

This diepoxide (100 g) and 2,6-di-tert.butyl-p-cresol (0.2 g) were mixed and heated to 100° C. To this mixture was added, over 1½ hours, a mixture of methacrylic acid (45 g), a 5% solution of chromium octanoate in light petroleum (0.1 g), and 2,6-di-tert.butyl-p-cresol (0.4 g). This mixture was stirred at 100° C. until the epoxide content was negligible.

2-(Methacryloyloxy)ethyl methyl-5-carboxybicyclo[2.2.1]hept-2-ene-6-carboxylate was prepared by heating a mixture of methylbicyclo[2.2.1]hept-2-ene-5,6-dicarboxylic acid anhydride (89 g) and 2-hydroxyethyl methacrylate (65 g) containing 0.44 g of tetramethylammonium chloride and 0.3 g of 2,6-di-tert.butyl-p-cresol to 90° C. and stirring at that temperature for a further 3 hours.

2-(Methacryloyloxy)ethyl 5-carboxycyclohex-1-ene-4-carboxylate was prepared similarly, using 82 g of tetrahydrophthalic acid anhydride in place of the methylbicyclo[2.2.1]hept-2-ene-5,6-dicarboxylic anhydride.

1-Allyloxycarbonyl-2-(3-methacryloyloxy-2-hydroxypropoxycarbonyl)benzene was prepared as follows:

Phthalic anhydride (74 g), allyl alcohol (87 g), and tetramethylammonium chloride (0.16 g) were mixed and stirred at 80° C. for 1¼ hours. The mixture was then cooled and excess allyl alcohol removed in vacuo. The residue (103 g) was treated with tetramethylammonium chloride (0.17 g) and 2,6-di-tert.butyl-4-methylphenol (0.35 g) and heated to 80° C., at which temperature glycidyl methacrylate (71 g) was added dropwise over ½ hour. The mixture was stirred at 80° C. for a further 2½ hours; the product, having an epoxide content of 0.48 equiv./kg., weighed 174 g.

N,N',N''-tris(2-(mercaptoacetoxy)ethyl)-1,3,5-triazine-2,4,6-trione was prepared by heating to reflux for 4½ hours in a Dean and Stark apparatus a mixture comprising 125.5 g of tris(2-hydroxyethyl)isocyanurate, 142.6 g of thioglycollic acid, 4.14 g of toluene-p-sulphonic acid, and 250 ml of toluene (30 ml of water being collected), then allowing the toluene solution to cool, washing it twice with 250 ml of water, once with 250 ml of 5% aqueous sodium bicarbonate solution, again with 250 ml of water, drying over magnesium sulphate, filtering, and distilling off the toluene. Yield 190 g, thiol content 5.9 equiv./kg.

1,3-Bis(2-(mercaptoacetyloxy)ethyl)-5,5-dimethylhydantoin was prepared similarly from 113 g of 1,3-bis(2-hydroxyethyl)-5,5-dimethylhydantoin and 96.6 g of thioglycollic acid (water collected, 20 ml). Yield 138.5 g, thiol content 5.3 equiv./kg.

EXAMPLE 1

A mixture comprising 10 g of 2,2-bis(3-allyl-4-(3-(methacryloyloxy)-2-hydroxypropoxy)phenyl)propane, 5g of 2-(methacryloyloxy)ethyl methyl-5-carboxybicyclo[2.2.1]hept-2-ene-6-carboxylate, 3.8 g of pentaerythritol tetrathioglycollate (i.e., 1 thiol equivalent per allyl group), and 0.56 g of benzil dimethyl ketal was applied as a film 10 μm thick to a copper-clad laminate.

Irradiation for 1 second under a mercury arc lamp rated at 80 w per cm at a distance of 8 cm resulted in production of a tack-free film. Further irradiation for 15 minutes through a photographic negative under a mercury arc lamp rated at 30 w per cm at a distance of 22 cm followed by development in 1% aqueous sodium hydroxide solution resulted in formation of a good image, which could subsequently be removed by immersing the laminate in 10% aqueous sodium hydroxide solution.

EXAMPLE 2

The procedure of Example 1 was repeated, using 1.2 g of acrylic acid in place of the 2-(methacryloyloxy)ethyl methyl-5-carboxybicyclo[2.2.1]hept-2-ene-6-carboxylate. A good image was formed on development with 1% aqueous sodium hydroxide solution.

EXAMPLE 3

A mixture, prepared as in Example 1 but containing 10 g of 2-(methacryloyloxy)ethyl 5-carboxycyclohex-1-ene-4-carboxylate in place of the 2-(methacryloyloxy)ethyl methyl-5-carboxybicyclo[2.2.1]hept-2-ene-6-carboxylate, and 0.71 g of benzil dimethyl ketal, was applied to the copper-clad laminate and irradiated similarly except that exposure for 2 seconds was required to obtain a tack-free layer. After the further irradiation the layer was developed with 1% aqueous sodium carbonate solution, a good image being formed. This image could be subsequently removed by immersion in 5% aqueous sodium hydroxide solution.

EXAMPLE 4

The procedure of Example 1 was repeated, employing 5.6 g of N,N',N''-tris(2-mercaptoacetyloxy)ethyl)-1,3,5-triazine-2,4,6-trione instead of the pentaerythritol tetrathioglycollate and 0.63 g, instead of 0.56 g, of benzil dimethyl ketal. Only 10 minutes' irradiation through a negative was necessary to obtain, on development with 1% aqueous sodium hydroxide solution, a good image.

EXAMPLE 5

The procedure of Example 1 was repeated, employing 6.2 g of 1,3-bis(2-(mercaptoacetyloxy)ethyl)-5,5-dimethylhydantoin in place of the pentaerythritol tetrathioglycollate and 0.65 g, instead of 0.56 g, of benzil dimethyl ketal. A good image was obtained on development with 1% aqueous sodium hydroxide solution.

EXAMPLE 6

A composition comprising 10 g of 2,2-bis(3-allyl-4-(3-(methacryloyloxy)-2-hydroxypropoxy)phenyl)propane, 5 g of 2-(methacryloyloxy)ethyl 5-carboxycyclohex-1-ene-4-carboxylate, 6.2 g of 1,3-bis(2-(mercaptoacetyloxy)ethyl)-5,5-dimethylhydantoin, and 0.65 g of 2,2'-azobis(2-methylpropionitrile) was applied as a film 10 μm thick on tinplate and cured by heating at 120° C. for 10 minutes. A solvent-resistant coating was obtained.

EXAMPLE 7

A composition comprising 7.0 g of 1-allyloxycarbonyl-2-(3-methacryloyloxy-2-hydroxypropoxycarbonyl)benzene, 1.4 g of acrylic acid, 2.2 g of ethylene glycol dithioglycollate, and 0.2 g of benzil dimethyl ketal was applied as a film 10 μm thick to a copper-clad laminate.

Irradiation for 10 seconds under a mercury arc lamp (80 w per cm) at a distance of 8 cm resulted in production of a tack-free film. Further irradiation for 20 minutes through a photographic negative under a mercury arc lamp (30 w per cm) at a distance of 22 cm, followed by development in 1% aqueous sodium carbonate solution, resulted in formation of a good image.

What is claimed is:

1. A polymerizable film-forming composition comprising
   (a) a compound containing in the molecule
      (i) at least one group selected from acryloyloxy or methacryloyloxy groups,
      (ii) at least one group selected from allyl, methallyl, or 1-propenyl groups, each of which is attached, directly or through an oxygen atom or through an oxycarbonyl group (—OCO—), to a carbon atom which forms part of an aromatic nucleus,
   (b) a compound containing in the molecule
      (iii) at least one group selected from acryloyloxy or methacryloyloxy groups and
      (iv) at least one free carboxyl group, and
   (c) a compound containing, per molecule, at least two mercaptan groups directly attached to an aliphatic carbon atom or atoms, in a proportion as to supply at least 0.8 such mercaptan group per group selected from allyl, methallyl, or 1-propenyl groups in (a) but less than 1.0 such mercaptan group per group selected from acryloyl, methacryloyl, allyl, methallyl, or 1-propenyl groups in (a) with (b).

2. A composition of claim 1 in which component (a) contains a total of at least three of the groups (i) and (ii).

3. A composition of claim 1 in which each said acryloyloxy or methacryloyloxy group in component (a) is attached to a carbon atom of an aromatic nucleus, directly or through a group of formula

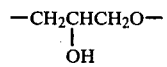

or through a group of formula

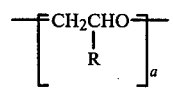

where
R denotes a hydrogen atom or a methyl group and
a is an integer of from 1 to 6.

4. A composition of claim 3 in which component (a) is a polyhydric phenol, at least two phenolic hydroxyl groups of which are esterified with acryloyl or methacryloyl groups, either directly or through the terminal ether oxygen atom of a group of formula I or II, and at least two phenolic hydroxyl groups of which are directly etherified with groups chosen from allyl, methallyl, or 1-propenyl groups.

5. A composition of claim 3 in which component (a) is a polyhydric phenol, at least two phenolic hydroxyl groups of which are esterified with groups chosen from acryloyl or methacryloyl groups, either directly or through the terminal ether oxygen atom of a group of formula I or II, the polyhydric phenol being substituted directly on carbon atoms in at least one benzene or naphthalene nucleus by at least two groups selected from allyl, methallyl, or 1-propenyl groups.

6. A composition of claim 3 in which component (a) is a polycarboxylic acid, at least one carboxylic acid group of which is linked to an acryloyl or methacryloyl group through the terminal carbon atom of a group of formula I or II and at least one carboxylic acid group of which is esterified directly with a group chosen from allyl, methallyl, or 1-propenyl groups.

7. A composition of claim 1 in which the or each acryloyloxy or methacryloyloxy group in component (b) is attached either directly to a hydrogen atom or, directly or via a carboxyl-containing group, to a carbon atom of an aliphatic, cycloaliphatic, or aromatic group or to a nitrogen atom forming part of a heterocyclic ring.

8. A composition of claim 7 in which the said carboxyl-containing group is of formula.

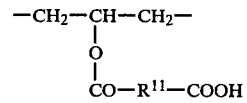

where $R^{11}$ denotes an alkylene, arylene, or aralkylene group, or an alkylene, arylene, or aralkylene group which is substituted by at least one group —COOH, the said alkylene groups, and the alkylene portion of aralkylene groups, having from 2 to 10 carbon atoms and the said arylene groups, and the arylene portion of aralkylene groups, having from 6 to 10 carbon atoms.

9. A composition of claim 1 in which component (b) is present in an amount providing from 0.75 to to 1.25 groups selected from acryloyloxy or methacryloyloxy groups per group selected from acryloyloxy or methacryloyloxy groups present in component (a).

10. A composition of claim 1 wherein component (c) is an ester of a monomercaptanalkylenecarboxylic acid with a polyhydric alcohol or of an aliphatic monomercaptanmonohydric alcohol with a polycarboxylic acid.

* * * * *